United States Patent [19]

Iwata et al.

[11] Patent Number: 4,499,238

[45] Date of Patent: Feb. 12, 1985

[54] THERMOPLASTIC RESIN PRODUCTS HAVING PEARL-LIKE LUSTER

[75] Inventors: Nobutoshi Iwata, Tokyo; Kiyoshi Fukushima, Kanagawa; Shinji Fujino; Takeshiro Yamada, both of Tokyo; Hideyuki Hao, Hyougo; Shigeo Tanaka; Tatsuyuki Mitsuno, both of Chiba, all of Japan

[73] Assignees: Nippon Steel Chemical Co., Ltd., Tokyo; Sumitomo Chemical Company, Limited, Osaka, both of Japan

[21] Appl. No.: 464,500

[22] PCT Filed: May 21, 1982

[86] PCT No.: PCT/JP82/00186

§ 371 Date: Jan. 24, 1983

§ 102(e) Date: Jan. 24, 1983

[87] PCT Pub. No.: WO82/04058

PCT Pub. Date: Nov. 25, 1982

[30] Foreign Application Priority Data

May 23, 1981 [JP] Japan ................................. 56-77377

[51] Int. Cl.³ ...................... C08L 23/12; C08L 53/02
[52] U.S. Cl. ........................................ 525/98; 525/901
[58] Field of Search ................................ 525/901, 98

[56] References Cited

U.S. PATENT DOCUMENTS

| 4,086,298 | 4/1978 | Fahrbach | 525/98 |
| 4,101,498 | 7/1978 | Snyder | 525/98 |
| 4,180,530 | 12/1979 | Bi et al. | 525/98 |
| 4,258,145 | 3/1981 | Wright | 525/98 |
| 4,343,918 | 8/1982 | Bohm et al. | 525/194 |

FOREIGN PATENT DOCUMENTS

| 46-8585 | 3/1971 | Japan . |
| 46-27600 | 8/1971 | Japan . |
| 47-42728 | 10/1972 | Japan . |
| 51-31745 | 3/1976 | Japan . |
| 55-5542 | 2/1980 | Japan . |
| 55-34270 | 3/1980 | Japan . |
| 55-34271 | 3/1980 | Japan . |

Primary Examiner—Carman J. Seccuro
Attorney, Agent, or Firm—Armstrong, Nikaido, Marmelstein & Kubovcik

[57] ABSTRACT

Various resin products having beautiful pearl-like pattern or luster and excellent mechanical strength such as impact strength and hinging properties are produced by molding a mixture of styrene-butadiene block copolymer containing 10 to 35 wt % butadiene and 65 to 90 wt % styrene, showing resinous properties, and having a specific block form and crystalline polypropylene (content of the former copolymer: 25 to 95 wt %).

6 Claims, No Drawings

THERMOPLASTIC RESIN PRODUCTS HAVING PEARL-LIKE LUSTER

TECHNICAL FIELD

The present invention relates to a resin composition used in the manufacture of thermoplastic resin products having pearl-like luster, as well as thermoplastic resin moldings obtained by molding this resin composition and having pearl-like luster, and the manufacturing method therefor. More particularly, the present invention relates to thermoplastic resin products having beautiful pearl-like patterns and luster and excellent mechanical strength such as impact strength and hinging properties.

BACKGROUND ART

In recent years, resin products are used in extremely wide-ranging fields, and requirements for these resin products have also been diversified. As one of such requirements, light electrical appliance parts, various containers for foodstuffs and cosmetics, and many other plastic household utensils and the like are required to be provided with beautiful luster and patterns on their surfaces to enhance their product value without impairing the numerous characteristics inherent in resin products.

To meet this requirement, several thermoplastic resin compositions have hitherto been proposed which provide resin products the surface texture of which per se has pearl-like luster. For example, Japanese Patent Publication No. 31467/1971 discloses a resin composition consisting essentially of acrylic resin, saturated aliphatic olefin resin and styrene resin; Japanese Patent Publication No. 41905/1976 discloses a resin composition containing styrene resin, styrene-acrylic resin and styrene-butadiene block copolymer resin; and Japanese Patent Publication Nos. 161837/1980 and 5542/1980 (although the latter does not refer to pearl-like luster) discloses a resin composition containing styrene resin and olefin resin.

However, these resin products having pearl-like luster are still insufficient in kind and number, and cannot adequately meet the needs of the market. Also, even if beautiful pearl-like luster could be obtained, there have been such problems as deterioration in the properties of the resin products, including such mechanical strength as impact strength and hinging properties, as well as decrease in moldability. In addition, more than three kinds of resin must be compounded at a predetermined ratio, which results in higher production costs.

Hence, pearl-like pigments are in some cases used as a means of obtaining resin products having pearl-like luster, but the use of such pigments is not economical because of an increase in the number of molding processes, and it also has a defect that the pearl-like luster of the surface is susceptible to discoloration.

It is, therefore, an object of the present invention to provide a novel resin composition used in the manufacture of thermoplastic resin products having pearl-like luster.

It is another object of the present invention to provide novel thermoplastic resin moldings having pearl-like luster.

It is a still another object of the present invention to provide a method of manufacturing novel thermoplastic resin moldings having pearl-like luster.

It is a further object of the present invention to provide resin products having beautiful pearl-like patterns and luster and excellent mechanical strength such as impact strength and hinging properties by molding a thermoplastic resin composition containing a styrene-butadiene block copolymer having a specific block form and crystalline polypropylene.

DISCLOSURE OF INVENTION

To this end, the present invention offers a novel resin composition used in the manufacture of thermoplastic resin products having a pearl-like luster, resin moldings manufactured from this resin composition and having pearl-like luster, and a method of manufacturing the resin moldings. More specifically, the resin composition consists essentially of: 25 to 95 wt% of a styrene-butadiene block copolymer having a butadient content of 10 to 35 wt% and having one kind or more than two kinds of block forms selected from a group of block forms expressed by general formulas such as $(S-B)n$, $S-(B-S)n$, $B-(S-B)n$, $S-B-(S-B)n$, $(S-B)xY$ and $\{(S-B)n\}xY$ (where S represents styrene or a polymer block consisting essentially of styrene; B, butadiene or a polymer block consisting essentially of butadiene; n, an integer ranging between 1 to 5; Y, the residue of a polyfunctional coupling agent used in the form of a radial polymer; and x, an integer of at least more than 3, representing the number of the functional groups of this polyfunctional coupling agent); and 5 to 75 wt% of crystalline polypropylene.

In the present invention, the styrene-butadiene block copolymer having a butadiene content ranging between 10 to 35 wt% and a styrene content ranging between 65 to 90 wt% and showing resinous properties is compounded by several methods. One is to polymerize a butadiene monomer and a styrene monomer in steps in a hydrocarbon solvent using an organic lithium polymerization initiator. Another is to simultaneously polymerize a monomer mixture of the two in a nonpolar solvent. A still another is to polymerize rubber and styrene monomer in a nonpolar solvent. Various types are included among the block forms of this styrene-butadiene block copolymer. According to the present invention, however, preferable forms are one or more than two kinds of block forms selected from a group of block forms expressed by general formulas such as $(S-B)n$, $S-(B-S)n$, $B-(S-B)n$, $S-B-(S-B)n$, $(S-B)xY$ and $\{(S-B)n\}xY$ (where S represents styrene or a polymer block consisting essentially of styrene; B, butadiene or a polymer block consisting essentially of butadiene; n, an integer ranging between 1 to 5; Y, the residue of a polyfunctional coupling agent used in the form of a radial polymer; and x, an integer of at least more than 3, representing the number of functional groups of this polyfunctional coupling agent), and more preferably of the type having the form of a radial polymer expressed by $\{(S-B)n\}xY$, among the aforementioned block forms. A method of manufacturing this type of polymer is disclosed, for instance, in U.S. Pat. No. 3,639,517.

Moreover, crystalline polypropylene employed in the present invention is a propylene homopolymer produced by a known method and a random copolymer between propylene and α-olefin having a carbon number of between 2 to 18.

Further, it is essential that the blending of a styrene-butadiene block copolymer and crystalline polypropylene be effected in such a way that the former, i.e., the styrene-butadiene block copolymer, will fall within the range of 25 to 95 wt%. It is impossible to obtain beautiful pearl-like luster and patterns if the content of the former in the resin composition is less than 25 wt% or more than 95 wt%. The blending ratio between the styrene-butadiene block copolymer and crystalline polypropylene should be determined in such a way that the content of the former falls within the range of 25 to 95 wt%, by taking into consideration such factors as impact strength, hinging properties, chemical resistance, rigidity and heat resistance that are required of resin products obtained by molding. The content of the styrene-butadiene block copolymer should be preferably 30 to 90 wt%, and more preferably 40 to 60 wt%.

In the present invention, as a method of blending the styrene-butadiene block copolymer and crystalline polypropylene, it is preferred to employ a compounding method adopted for general thermoplastic resins. For instance, the aforementioned components can be mixed in a solid state and then processed into a pelletized state after mixing them thoroughly by using a roll mill or Banbury mixer and the like, or the aforementioned two components can be mixed in a solid state and then pelletized by using an extruder.

Furthermore, in the present invention, it is a matter of course that during or prior to the blending mentioned above it is possible to add in the resin composition such ordinary additives as a plasticizer, stabilizing agent, colorant, antistatic agent, and nucleus-forming agent. By the use of these additives, it is possible to produce their expected effects, respectively.

The resin composition of this invention thus obtained does not produce beautiful pearl-like luster simply by mixing the two components; the pearl-like luster is produced by subjecting it to molding. As a method of molding the resin composition, it is possible to adopt an ordinary method, including injection molding, extrusion molding, blow molding and vacuum forming. It should be noted that if a mixture of the aforementioned components in a solid state is immediately molded into a final products, an interlaminar exfoliation may occur, resulting in a poor external appearance. As for resin moldings thus obtained, there are housings for such light electrical appliances as radios and television sets, various containers for such as foodstuffs and cosmetics, and other plastic goods used at home.

BEST MODE FOR CARRYING OUT THE INVENTION

The method of the present invention is described hereunder more specifically with reference to an example.

A styrene-butadiene block copolymer (produced and sold by Phillips Peteroleum Company under the brand name of K-Resin ®, KR-03) having a butadiene content of 25 wt% and a styrene content of 75 wt% and having the form of a radial polymer the block form of which is expressed by a general formula {(S-B)n}xY (where S is a styrene polymer block; B, a butadiene polymer block; n, an integer ranging between 1 to 5, Y, the residue of a polyfunctional coupling agent; and x, an integer of at least more than 3, representing the number of functional groups of this polyfunctional coupling agent) and propylene homopolymer (produced and sold by Sumitomo Chemical Co., Ltd., under the brand name of Sumitomo Noblen ®, FH2011) were mixed in ratios shown in Table 1 below and blended at 200° C. using a 4φ extruder. The resin composition thus obtained was molded into tabular test pieces of 3.0 mm thickness at the molding temperature of 210° C. using a 10 oz. injection molding machine. An investigation was then conducted of the pearl-like luster of the surfaces of each test piece, and at the same time falling weight impact strength and hinging properties were measured. The results are shown in Table 1.

The falling weight impact strength test was conducted in accordance with JIS K 7211. However, the diameter of the test piece supporting table was 140 mm, and the weight was a steel weight having a radius of 6.4 mm at its end. As for the method of the hinging test, the test was carried out by fabricating hinging test pieces having a hinge thickness of 0.4 mm by injection molding and by measuring the number of times until the hinge portion was broken under the conditions of a bending angle of 110°, a load of 20 g, and the bending rate of 70 times/min.

TABLE 1

| Styrene-butadiene block copolymer (wt parts) | Propylene homopolymer (wt parts) | Assessment of pearl-like luster | Falling weight impact strength (230° C., ¼", kg · cm) | Hinging properties (No. of times) |
|---|---|---|---|---|
| 100 | 0 | X | 300 | 500 |
| 95 | 5 | ◯ | — | 20,000 |
| 90 | 10 | ◎ | — | 30,000 or above |
| 80 | 20 | ◎ | 300 | 30,000 or above |
| 70 | 30 | ◎ | — | 30,000 or above |
| 60 | 40 | ◎ | 164 | 30,000 or above |
| 50 | 50 | ◎ | — | 30,000 or above |
| 40 | 60 | ◎ | 102 | 30,000 or above |
| 30 | 70 | ◎ | — | 30,000 or above |
| 25 | 75 | ◯ | — | 30,000 or above |
| 20 | 80 | △ | 57 | 30,000 or above |
| 10 | 90 | X | — | 30,000 or above |

Criteria for pearl-like luster:
◎ represents extremely beautiful pearl-like patterns and luster
◯ represents beautiful pearl-like patterns and luster
△ represents slightly pearl-like luster
X represents no pearl-like luster As is evident from the results shown in Table 1, in this example, when the content of the styrene-butadiene block copolymer was 25 to 95 wt%, beautiful pearl-like luster was shown, and excellent results were obtained for both falling weight impact strength and hinging properties. Also, when the content of the styrene-butadiene block copolymer was 30 to 90 wt%, extremely beautiful pearl-like luster and patterns were exhibited.

Industrial Applicability

As described above, thermoplastic resin products having pearl-like luster according to the present invention are obtained from two kinds of resin, namely, a specific styrene-butadiene block copolymer and crystalline polypropylene and have beautiful pearl-like patterns and luster as well as excellent impact strength and hinging properties. Therefore, in light electrical appliance parts various containers for such as foodstuffs and cosmetics, as well as many other plastic household utensils, it is possible to enhance their product value without impairing the numerous properties inherent in synthetic resin and to provide such resin products at low prices.

What is claimed is:

1. A resin composition for manufacturing thermoplastic resin products having a pearl-like luster and consisting essentially of: 25 to 95 wt% of a styrene-butadiene block copolymer having a butadiene content of 10 to 35 wt% and having a block form expressed by a general formula $\{(S-B)n\}xY$ (where S represents styrene or a polymer block consisting essentially of styrene; B, butadiene or a polymer block consisting essentially of butadiene; n, an integer ranging between 1 to 5; Y, the residue of a polyfunctional coupling agent used in the form of a radial copolymer; and x, an integer of at least more than 3, representing the number of the functional groups of said polyfunctional coupling agent); and 5 to 75 wt% of crystalline polypropylene.

2. A resin composition according to claim 1, wherein the content of said styrene-butadiene copolymer is 30 to 90 wt%.

3. A resin molding the surface of which has pearl-like luster and which is produced from a resin composition obtained from the blending of a mixture consisting essentially of: 25 to 95 wt% of a styrene-butadiene block copolymer having a butadiene content of 10 to 35 wt% and having a block form expressed by a general formula $\{(S-B)n\}xY$ (where S represents styrene or a polymer block consisting essentially of styrene; B, butadiene or a polymer block consisting essentially of butadiene; n, an integer ranging between 1 to 5; Y, the residue of a polyfunctional coupling agent used in the form of a radial copolymer; and x, an integer of at least more than 3, representing the number of the functional groups of said polyfunctional coupling agent); and 5 to 75 wt% of crystalline polypropylene.

4. A resin molding according to claim 3, wherein the content of said styrene-butadiene block copolymer is 30 to 90 wt%.

5. A resin molding according to claim 3, wherein said resin composition consisting essentially of said styrene-butadiene block copolymer and crystalline polypropylene is obtained by blending the two components after mixing them in a solid state and then molding them into a pelletized state.

6. A method of manufacturing a resin molding having pearl-like luster comprising the steps of: mixing in a solid state, and then, blending the resultant mixture which consists essentially of: 25 to 95 wt% of a styrene-butadiene block copolymer having a butadiene content of 10 to 35 wt% and having a block form expressed by a general formula $\{(S-B)n\}xY$ (where S represents styrene or a polymer block consisting essentially of styrene; B, butadiene or a polymer block consisting essentially of butadiene; n, an integer ranging between 1 to 5; Y, the residue of a polyfunctional coupling agent used in the form of a radial copolymer; and x, an integer of at least more than 3, representing the number of the functional groups of said polyfunctional coupling agent); and 5 to 75 wt% of crystalline polypropylene then molding the blended mixture into pellets.

* * * * *